(12) United States Patent
Berg et al.

(10) Patent No.: US 6,311,388 B1
(45) Date of Patent: Nov. 6, 2001

(54) METHOD OF MAKING AIR BEARING WITH CORNER STEPS

(75) Inventors: Lowell J. Berg, Minnetonka; Zine-Eddine Boutaglou, Vadnais Heights, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/124,274

(22) Filed: Jul. 29, 1998

Related U.S. Application Data

(60) Provisional application No. 60/059,796, filed on Sep. 22, 1997.

(51) Int. Cl.[7] .............................. G11B 5/127; H04R 31/00
(52) U.S. Cl. ..................................... 29/603.12; 29/603.16; 360/235.4
(58) Field of Search ............................ 29/603.07, 603.12, 29/603.16; 360/235.4, 236.4–236.9

(56) References Cited

U.S. PATENT DOCUMENTS

| | | | |
|---|---|---|---|
| Re. 35,477 | * 3/1997 | Hussinger et al. | 29/603.07 |
| 5,062,017 | 10/1991 | Strom et al. | 360/103 |
| 5,329,689 | * 7/1994 | Azuma et al. | 29/603.07 |
| 5,343,343 | 8/1994 | Chapin | 360/103 |

OTHER PUBLICATIONS

Aric Menon, 30–Series Technology Challenges, From 30% HGA Status in the Industry, Comdex, Fall 1996.
Annotated copy of Strom et al, Oct. 1991.*
Annotated copy of Azuma, Jul. 1994.*

* cited by examiner

*Primary Examiner*—Lee Young
*Assistant Examiner*—Rick Kiltae Chang
(74) *Attorney, Agent, or Firm*—Kinney & Lange, P.A.

(57) ABSTRACT

An air bearing slider for a disc drive includes an air bearing surface defined on the disc opposing face at least in part by a first step or cavity. An additional corner step is defined in bar processing, deeper than the first cavity. With the corner step, the first cavity does not extend quite all the way to the corner of the slider. The corner of the slider, formed on one face by dicing of the bar into individual sliders, is at an additional depth due to the corner step. The corner steps are preferably narrow, such as nominally one to two times the tolerance value on the dice cut. If a shock event occurs which causes the air bearing slider to contact the disc at certain roll and pitch angles, the corner step edge will contact the disc rather than the dice cut corner. The corner step thus lessens the probability of contact between the disc and the corners of the air bearing slider, and contact with a dice cut edge of the slider is avoided. This reduces the amount of damage to the disc drive caused by the shock event.

20 Claims, 6 Drawing Sheets

METHOD OF MAKING AIR BEARING WITH CORNER STEPS

CROSS-REFERENCE TO RELATED APPLICATION(S)

This application claims the benefit of provisional application No. 60/059,796 filed on Sep. 22, 1997, entitled MILLED DICE CUT EDGES FOR IMPROVED HEAD/DISC SHOCK ROBUSTNESS.

BACKGROUND OF THE INVENTION

The present invention relates to air bearing sliders for disc drives, and more particularly, to air bearing sliders having an air bearing surface which is removed from a corner of the slider body.

Air bearing sliders have been extensively used in magnetic disc drives to appropriately position a transducer above a rotating magnetic disc. The rotation of the disc at high speed generates a "wind" of air immediately adjacent the flat surface of the disc. A disc opposing face the air bearing slider interacts with the wind to bias the slider away from the disc and against a load beam, causing the slider to "fly" a small distance above the disc. Each slider is typically mounted on a gimble or load beam assembly which biases the slider toward the rotating disc, providing a spring force opposite to the bearing force of the wind incident on the disc opposing face of the slider.

When a disc drive is subjected to a mechanical shock of sufficient amplitude, the slider may overcome the biasing force of the load beam and lift off from the disc. Damage to the disc may occur when the slider returns to the disc and impacts the disc under the biasing force of the load beam. The damage to the disc can result in lost or inaccurate data, or in a fatal disc "crash" rendering the disc drive inoperable.

The contour of the disc opposing face of an air bearing slider has a significant effect on the flying characteristics of the air bearing slider, and various contours have been proposed and used for air bearing sliders. Examples of two of these are included in U.S. Pat. No. 5,062,017 to Strom et al. and U.S. Pat. No. 5,343,343 to Chapin, assigned to the assignee of the present invention and both incorporated herein by reference.

The disc opposing face of most air bearing sliders includes a defined "air bearing surface" which is a flat surface closest to the disc or extending furthest from the body of the slider. The air bearing surface is generally planar, but may have a slight crown. A tapered or stepped front edge may be included at the leading edge of the air bearing surface. One or more cavities is defined in the disc opposing face and having a generally constant depth from the air bearing surface. In particular, many sliders include an air bearing surface made up of two or more "rails" or "skis" running longitudinally along the disc opposing face. A large central cavity is commonly defined between two air bearing rails of the slider. In "negative pressure" air bearing sliders (or NPABs), a cross bar or other structure toward the leading edge of the slider is used to provide a negative pressure region in the central cavity.

In some air bearing sliders, such as that shown in Strom et al., the air bearing surface may extend the full length of the slider body and may include leading and trailing corners of the slider body. In other air bearing sliders, such as that shown in Chapin, a longitudinal edge step may be used such that the air bearing surfaces are removed inward from corners of the slider body.

The fabricating processes used to manufacture air bearing sliders commonly includes photolithographic material removal processes. In photolithographic removal, a protective coating may be applied to a portion of the disc opposing face of the slider body, and a thin layer of material not protected by the coating may be removed by a chemical or physical process. The chemical or physical process removes material over the exposed surfaces at a substantially uniform rate. The depth of the removed material is determined by the length of application time for the chemical or physical material removal process. Other processing steps include mechanical removal of material such as through lapping or polishing surfaces.

It is common to simultaneously manufacture a number of sliders arranged side by side along a "bar". After each of the air bearing surfaces has been defined and commonly machined on the bar to the extent possible, the bar is diced into individual air bearing sliders. Because processing steps require approximately equal expense regardless of whether performed on multiple aligned sliders at once or on a single slider, "bar level processing", i.e., the simultaneous processing of multiple sliders each part of the bar and prior to dicing, is significantly more efficient than "slider level processing".

In bar level processing, the air bearing surface, the leading edge and the trailing edge can be polished very flat and smooth. The surfaces produced by the machined dice cuts, however, are quite rough with jagged edges compared to the polished edges of the air bearing surface. Because polishing of the side edges of the slider body would require slider level processing, the sides of the slider may be left with the as cut edges and without any lapping, polishing or other finishing operations on the sides of the slider.

The disc drive industry generally desires to manufacture disc drives which are more robust at withstanding shock events. At the same time, the contour of the air bearing surface of sliders is dictated to maximize flying performance, and the processing of sliders should be performed as efficiently as possible to reduce cost. The present invention addresses these concerns, and provides a more robust disc drive without significantly increasing cost or sacrificing slider performance.

BRIEF SUMMARY OF THE INVENTION

An air bearing slider for a disc drive includes an air bearing surface defined on the disc opposing face at least in part by a first step or cavity. An additional corner step is defined, deeper than the first cavity. With the corner step, the first cavity does not extend quite all the way to the corner edge of the slider defined in the dice cut. If a shock event occurs which causes the air bearing slider to contact the disc at certain roll and pitch angles, the edge of the first cavity win contact the disc rather than the dice cut corner. The corner step thus lessens the damage likelihood for contact between the disc and the corners of the air bearing slider, because contact with a dice cut edge of the slider is avoided. This reduces the likelihood of damage to the disc drive caused by the shock event.

DETAILED DESCRIPTION OF THE PREFERRED EMBODIMENTS

Figure 1:
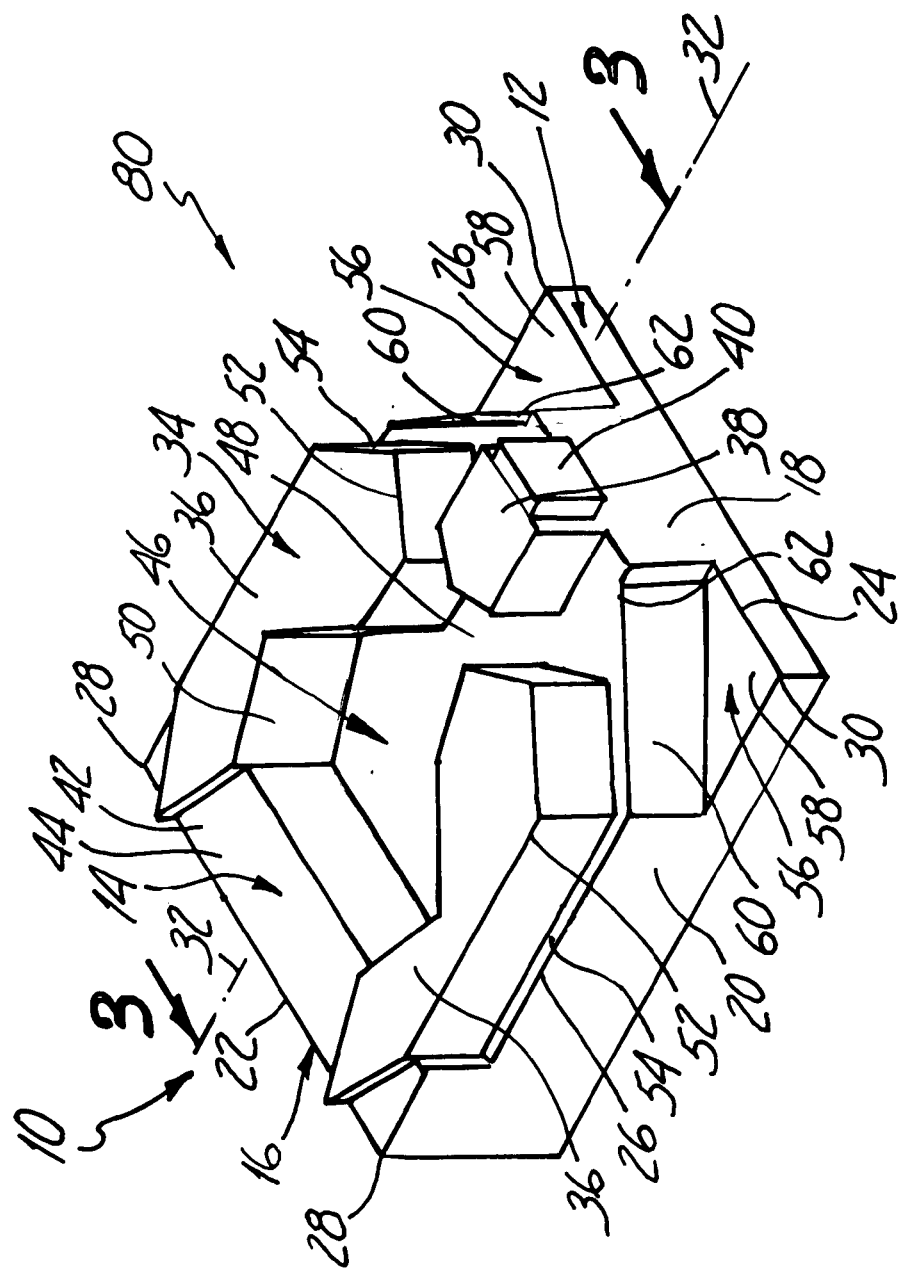
FIG. 1 is a perspective view of a slider according to the present invention.
Figure 2:
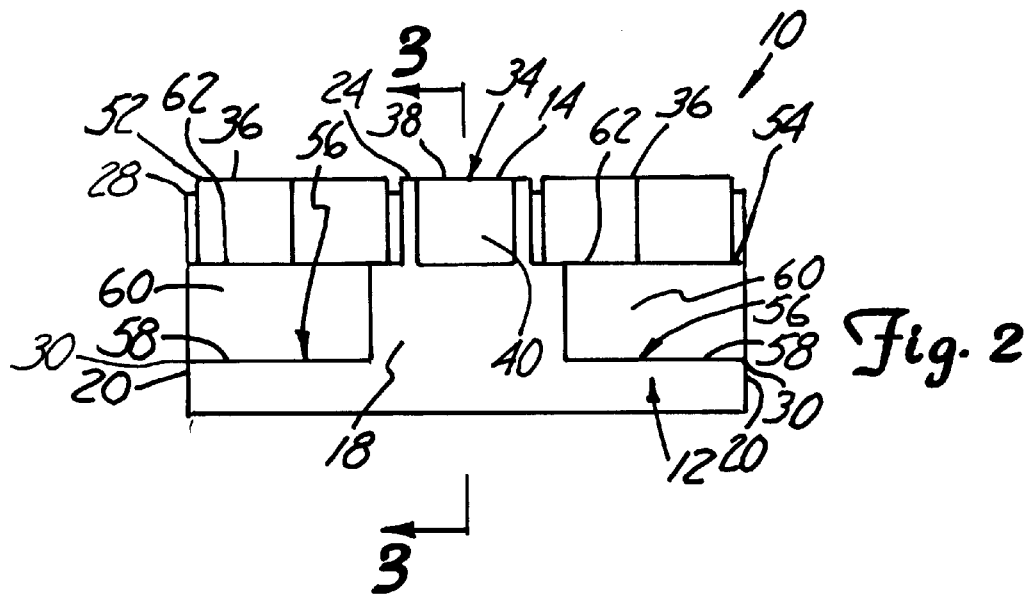
FIG. 2 is a rear view of the slider of FIG. 1.
Figure 3:
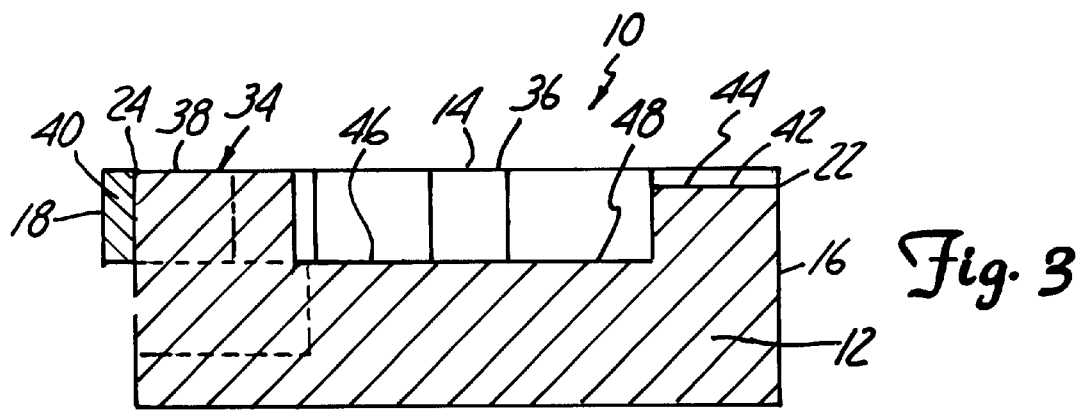
FIG. 3 is a cross sectional view of the slider of FIGS. 1 and 2 taken along line 3—3.
Figure 4:
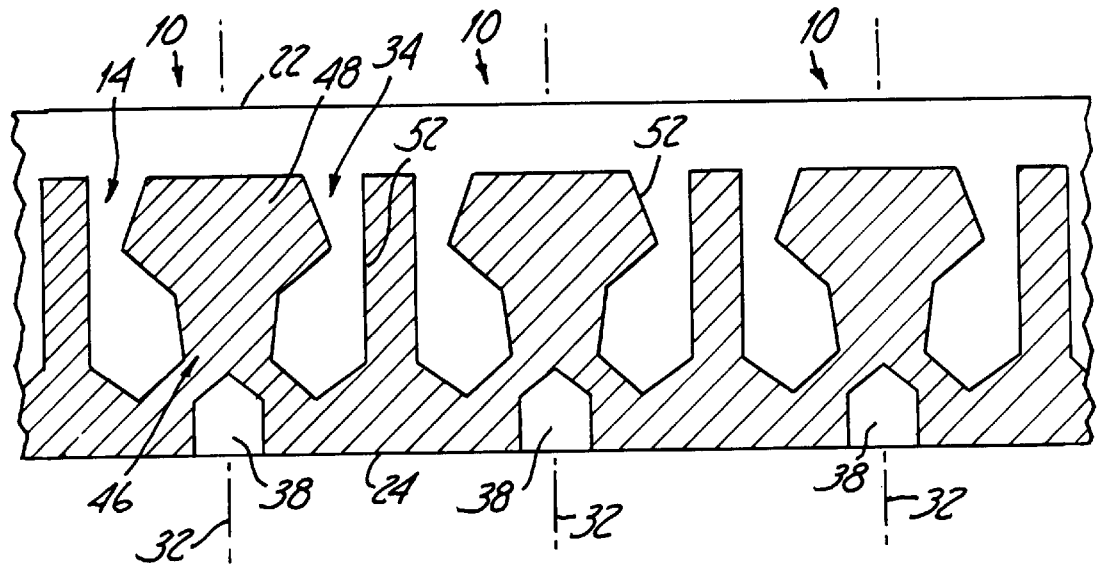
FIG. 4 shows a portion of a slider bar showing the cavity portions to be photolithographically removed in a first processing step toward creating the slider of FIG. 1.
Figure 5:
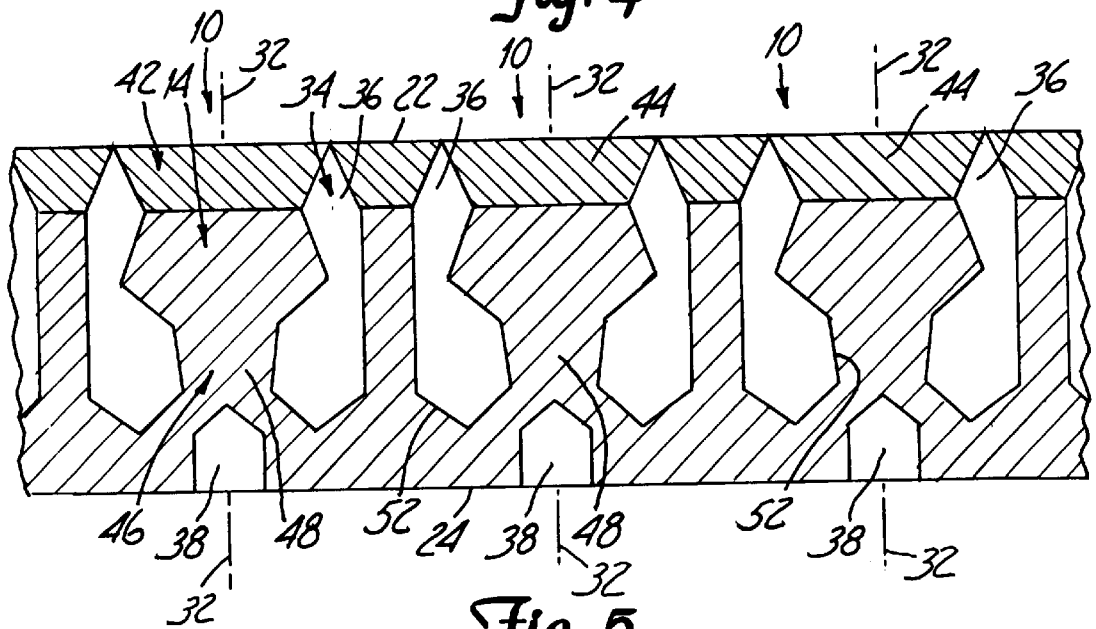
FIG. 5 shows application of a second photolithographic material removal step to the slider bar of FIG. 4 toward creating the slider of FIG. 1.
Figure 6:
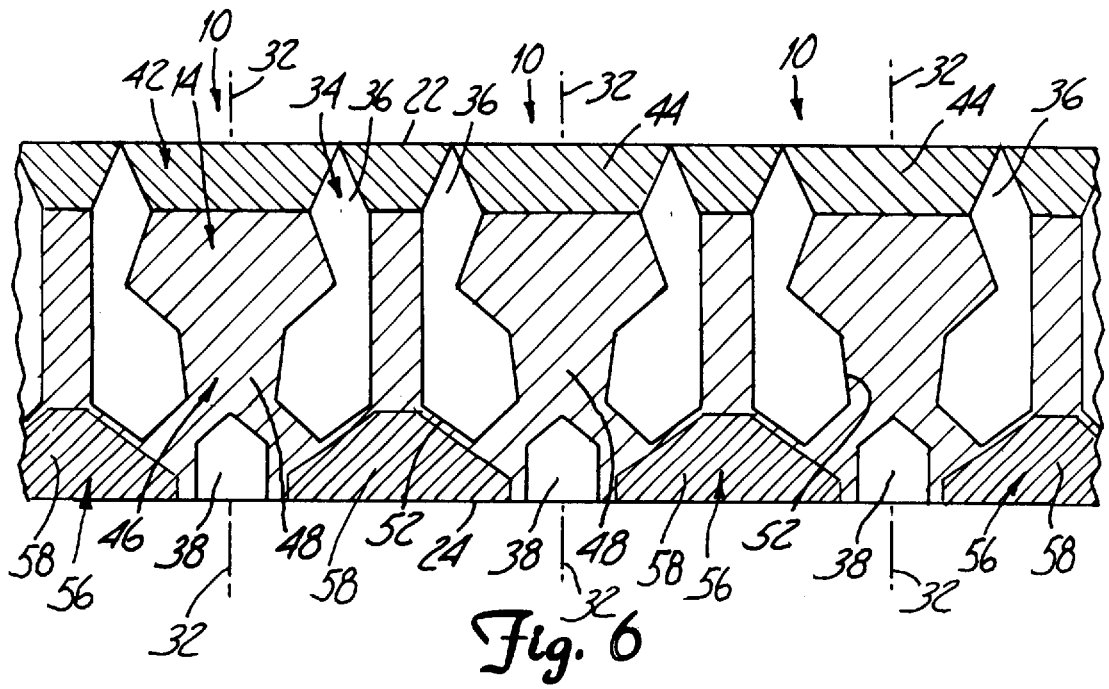
FIG. 6 shows application of a third photolithographic material removal step to the slider bar of FIG. 5 toward creating the slider of FIG. 1.

FIGS. 1–3 show a first embodiment of an air bearing slider 10 according to the present invention. Depth has been significantly exaggerated in FIGS. 1–3 to show detail. The air bearing slider 10 includes a slider body 12 with a disc opposing face 14 bounded by a leading face 16, a trailing face 18, and side faces 20 running from the leading face 16 to the trailing face 18. The leading face 16 and the trailing face 18 are preferably polished smooth, while the side faces 20 may be relatively rough. When used in the disc drive, the disc opposing face 14 is directed toward the disc. Generally speaking, the contours of the disc opposing face 14 determine the flying characteristics entirely, and the shape of the remainder of the slider body 12 is not critical.

The disc opposing face 14 intersects the leading face 16 at a leading edge 22, intersects the trailing face 18 at a trailing edge 24, and intersects the side faces 20 at side edges 26. The side edges 26 intersect the leading edge 22 at leading corners 28 and intersect the trailing edge 24 at trailing corners 30. A longitudinal axis 32 can be defined for the disc opposing face 14 spaced central to the side edges 26.

The disc opposing face 14 has an air bearing surface 34 which in this embodiment is made up of two longitudinally extending rails 36 and a center rail or trailing central pad 38. The rails 36 do not extend for the full length of the slider 10, but rather are removed from the trailing edge 24. The trailing central pad 38 extends to the trailing edge 24, but is removed or spaced significantly inward from the trailing corners 30.

The air bearing surface 34 interacts with the wind incident thereon to cause the slider 10 to "fly" above a moving disc. To ensure consistent interaction between the air bearing surface 34 and the wind, the air bearing surface 34 is a relatively smooth surface. The shape and dimensions of the air bearing surface 34 may be selected as necessary to achieve the desired flying characteristics. For instance, the slider 10 may have a preferred width of 1000 microns, and the trailing central pad 38 may be 250 microns wide. A transducer 40 such as a read/write thin film head may be carried on the trailing edge 24 of the slider 10, to read information from and write information to the disc. The transducer 40 may cover only a small area on the trailing face 18 as shown, or may alternatively cover the entirety of the trailing face 18, and may be fabricated in any shape, size and method as known in the art.

During operation of the disc drive, the slider 10 generally flies at a positive pitch angle, with the trailing edge 24 of the slider 10 (and the transducer 40 thereon) closest to the disc. The pitch angle may change somewhat based on the local wind velocity, primarily determined by the radial location of the slider 10, but the air bearing surface 34 is generally intended to minimize variances in pitch angle. During operation of the disc drive, the slider 10 may be accessed across the disc by a rotary actuator (not shown) so as to encounter a variety of skew angles relative to the wind. The slider 10 may exhibit various positive and negative roll angles about the longitudinal axis 32 at different skew angles and different access rates, but is generally intended to minimize roll. As shown, the air bearing surface 34 may have a relatively complex shape and geometry to provide the desired flying characteristics for the slider 10. When the disc drive stops operating, the slider 10 is positioned at a landing zone and the disc slowed to a stop, during which time the slider 10 will contact the disc and park on the disc. In the parked position, the air bearing surface 34 will form a generally flat contact against the surface of the disc so the slider 10 is parked with zero pitch angle and zero roll.

A leading step 42 is provided along the leading edge 22 of the slider 10, such as extending for about 20% of the slider length. The leading step 42 is fairly shallow, but nonetheless can be considered as a cavity removed from the air bearing surface 34. For instance, the leading step 42 may have a depth of about 0.3 microns relative to the air bearing surface 34. A portion of the leading step 42 adjacent the rails 36 helps to pressurize air onto the rails 36 during flying. Alternative to the leading step 42, a leading edge taper may be provided along the leading edge 22 of the air bearing surface 34.

A central portion 44 of the leading step 42 serves as a cross rail. Alternative to this central portion 44, a cross-rail structure may be provided separate and distinct from the leading step 42 or any leading edge taper.

A main cavity 46 is located behind the leading step 42, such as extending for about the trailing 80% of the slider length. With the central portion of the leading step 42 contacting the wind before the main cavity 46, the main cavity 46 has a slightly negative pressure during flying. The magnitude of the negative pressure increases with increased wind velocity (at outer tracks on the disc), to offset the increased positive pressure on the air bearing surface 34 caused by the increased wind velocity, such that the slider 10 maintains a substantially uniform fly height at all data tracks on the disc. Alternatively, the slider 10 may be designed such that the main cavity 46 has a slightly positive or ambient pressure. In either event, the pressure on the main cavity 46 during flying will be significantly less than the pressure on the air bearing surface 34.

The main cavity 46 has a substantially flat base 48, and sides 50 which are generally perpendicular to the cavity base 48. The cavity base 48 is substantially parallel to the air bearing surface 34, so all of the main cavity 46 has a generally constant depth. The main cavity 46 may be as deep as needed for the desired flying characteristics of the slider 10, such as a depth about 3 to 5 microns relative to the air bearing surface 34. The cavity base 48 and the cavity sides 50 are fairly smooth. The generally constant depth cavity 46 to a flat cavity base 48 is resultant from standard fabrication techniques, but is not overly critical to flying performance. Depending on the specific fabrication techniques used, the cavity base 48 may be slightly sloped, rougher or more rounded without significantly affecting flying characteristics of the slider 10.

The location of the cavity sides 50 defines the shape of the air bearing surface 34, and the air bearing surface 34 has a peripheral edge 52 where the air bearing surface 34 meets the cavity sides 50. The air bearing surface 34 is slightly removed from the side faces 20 of the slider body 12, such that the cavity base 48 continues to extend around the rails 36 of the air bearing surface 34 and form a side step 54. Because both the air bearing surface 34 and the cavity sides 50 are smooth, the peripheral edge 52 of the air bearing surface 34 is a relatively smooth edge.

A corner step 56 is provided at each of the trailing corners 30 of the slider 10. The preferred corner step 56 extends for only a portion of the length of the slider body 12, that is, for only the length that the rails 36 are removed from the trailing face 18. The corner step 56 has a substantially flat base 58, and sides 60 which are generally perpendicular to the corner step base 58. The corner step base 58 is substantially parallel to the air bearing surface 34, so all of the corner step 56 has a generally constant depth. The corner step 56 has a depth which is greater than the depth of the adjacent main cavity 46, such as a depth of about 7 microns. The corner step base 58 and the corner step sides 60 are fairly smooth. Particularly when on the trailing corners 30 of the air bearing slider 10 and when separated from the air bearing surface 34, the depth and surfaces of the corner step 56 are not overly critical to flying performance. Depending on the specific fabrication techniques used, the corner step 56 may have slightly sloped, rougher or more rounded surfaces without significantly affecting flying characteristics of the slider 10.

The sides 60 of the corner step 56 intersect the main cavity base 48 at a corner step edge 62. Because both the main cavity base 48 and the corner step sides 60 are smooth, the corner step edge 62 is a relatively smooth edge.

FIGS. 4–7 show a portion of bar 64 for processing into multiple sliders 10 such as shown in FIGS. 1–3. The cross-hatched portion of FIG. 4 reflects a first photolithographic material removal to form the main cavity 46. The oppositely hatched portion of FIG. 5 reflects a second photolithographic material removal to form the leading step 42. The third hatched portion of FIG. 6 reflects a third photolithographic material removal to form corner steps 56. The material removal steps shown in FIGS. 4–6 can be performed in any order, but at least three steps are generally necessary to define three different depths from the air bearing surface 34. However, if the leading step 42 has the same depth from the air bearing surface 34 as the depth of the corner steps 56 from the main cavity 46, then the second and third photolithographic material removal steps can be combined such that only two steps are required.

The main cavity 46, the leading step 42 or the corner steps 56 may be formed such as by either ion milling or reactive ion etching. Other processes can also be used as known in the art of material removal, and the term "photolithographic removal", as used herein, refers to any process used to remove material from specific defined areas on the slider bar 64. The several photolithographic removal steps used in processing the sliders 10 of the bar 64 define the air bearing surfaces 34. The photolithographic removal steps results in cavity sides 50, cavity bases 48, and corner step sides 60 which are relatively smooth.

The portion of the bar 64 shown includes three full locations for sliders 10. The bar 64 can extend as long as desired and include as many locations for sliders 10 as desired for efficient bar level processing.

The air bearing surfaces 34 are typically finished in bar level processing with a polishing or lapping operation. The finishing of the air bearing surfaces 34 can be performed either before, after or in between the photolithographic removal processes. In either event, the peripheral edges 52 of the air bearing surface 34, created with a finishing operation on the air bearing surface 34 and a photolithographic removal process on the cavity sides 50, are relatively smooth edges.

The bar 64 includes the leading face 16 and the trailing face 18 for each of the sliders 10. Each of the leading face 16 and the trailing face 18 may be lapped or polished in bar level processing, or before the bar 64 is cut from the wafer, to provide the proper leading and trailing edge 22, 24 of the slider 10. The finishing of the leading face 16 and trailing face 18 can be performed either before or after the finishing of the air bearing surfaces 34, and either before, after or in between the photolithographic removal processes.

Figure 7:
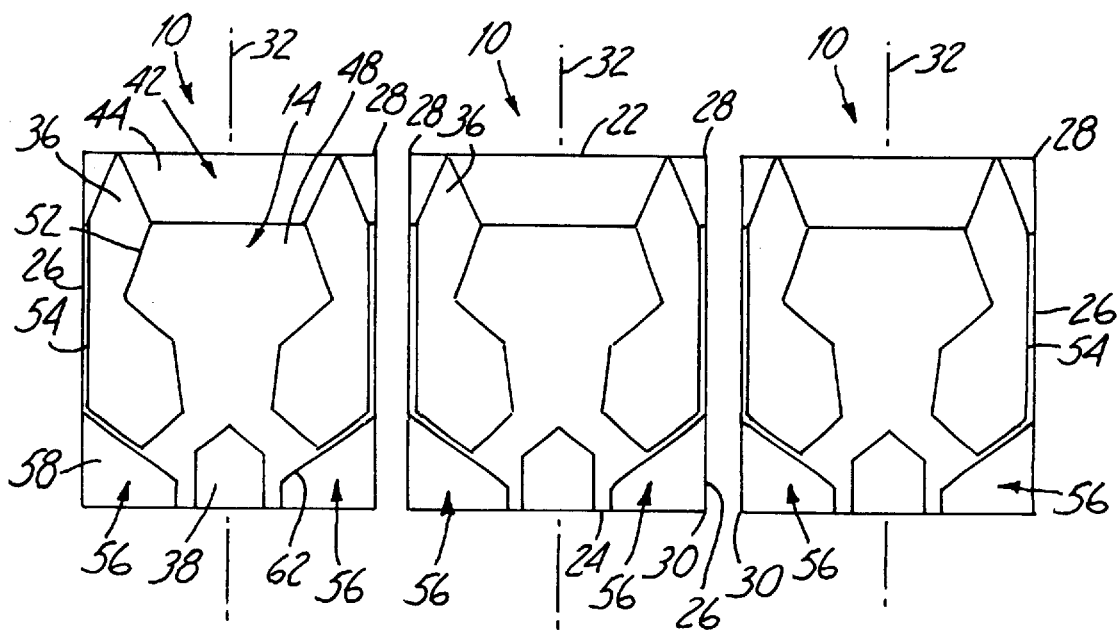
FIG. 7 shows the slider bar of FIG. 6 after dice cutting.

Preferably after the photolithographic removal processes and after the finishing operations, the bar 64 is dice cut in the locations shown in FIG. 7 into individual sliders 10. Each of the dice cuts may be performed such as with a diamond wheel saw. The dice cut results in relatively rough side faces 20 for each of the sliders 10. The location of the dice cut relative to the photolithographically defined air bearing surfaces 34 is subject to a tolerance, such as about plus or minus 25 microns.

A primary benefit of air bearing sliders 10 according to the present invention is in reducing the amount of damage to the disc drive caused by a shock event. In particular, the air bearing slider 10 of the present invention has a lessened probability of contact between either of the trailing corners 30 and the disc during a shock event.

Experimental evidence of shock events in prior art devices indicates that when the initial contact or recontact of the slider to the disc occurs at one of the dice cut corners, the damage to the disc is worse than when the initial contact point is a milled air bearing corner. Presumably this is because of the more jagged or rough nature of the dice cut surfaces, as compared to the smoother peripheral edges of the air bearing surface 34 formed at an intersection between a finished surface and a photolithographic removal surface.

Side faces 20 of the slider 10 could be made smoother by polishing the side faces 20 after cutting. However, in part because the polishing operation would have to be performed individually on each slider 10, i.e, in slider level processing rather than in bar level processing, this would be a difficult and uneconomical operation.

It is not necessary to polish the side faces 20 of the slider 10 of the present invention to mitigate the shock damage. Rather, the corner steps 56 of the present invention remove the dice cut corners 30 beyond the cavity depth so as to preclude contact between the trailing corners 30 and the disc at certain pitch and roll angles. The preferred corner step 56 protects against contact between the trailing corners 30 and the disc at roll angles of about 1° or more, and more preferably at roll angles of about 3° or more, and most preferably at roll angles of 5° or more.

To explain how the corner steps 56 of the present invention lessen the probability of contact between a disc and the trailing corners upon shock, consider the geometry of the preferred embodiment described with reference to FIGS. 1–7, but not having the corner steps 56. With a trailing central pad 38 width of 250 microns centered in a slider 10 of 1,000 microns width, the main cavity base 48 extends for 375 microns on each side of the trailing central pad 38. That is, the trailing portion of the air bearing surface 34 is removed laterally inward from the trailing corner by a distance of 375 microns. With a main cavity depth of 3 microns, and assuming a pitch large enough that the rails 36 are higher than the trailing corner, a roll angle of arctan (cavity depth/laterally removed distance)=arctan(3/375)=

0.46° or more results in the trailing corner contacting the disc. The present invention is particularly intended for modification of such slider designs where the trailing corner 30 would contact at a roll angle of 1° or less.

In contrast, considering again the slider 10 of the present invention with corner steps 56 having a corner step depth of 7 microns, the trailing corner 30 will not contact the disc unless the roll angle is at least arctan (7/375)=1.07°. With a corner step depth of 10 microns, the trailing corner 30 will not contact the disc unless the roll angle is at least arctan (10/375)=1.53°. At roll angles less than these values, contact is with the trailing pad 38 of the air bearing surface 34, which will generally not cause catastrophic damage.

At roll angles greater than 1.07°, whether the trailing corner 30 contacts the disc depends on the width of the corner step 56 along the trailing edge 24 of the slider 10. If the corner step 56 is sufficiently narrow, the corner step edge 62 will contact the disc rather than the trailing corner 30. For example, if the corner step 56 is 4 microns wide and 4 microns deeper than the main cavity 46, the corner step 56 will prevent contact between the trailing corner 30 and the disc up to a roll angle or arctan (4/4)=45°. Thus a very narrow corner step 56 will prevent contact between the trailing corner 30 and the disc up to a high roll angle.

Figure 8:
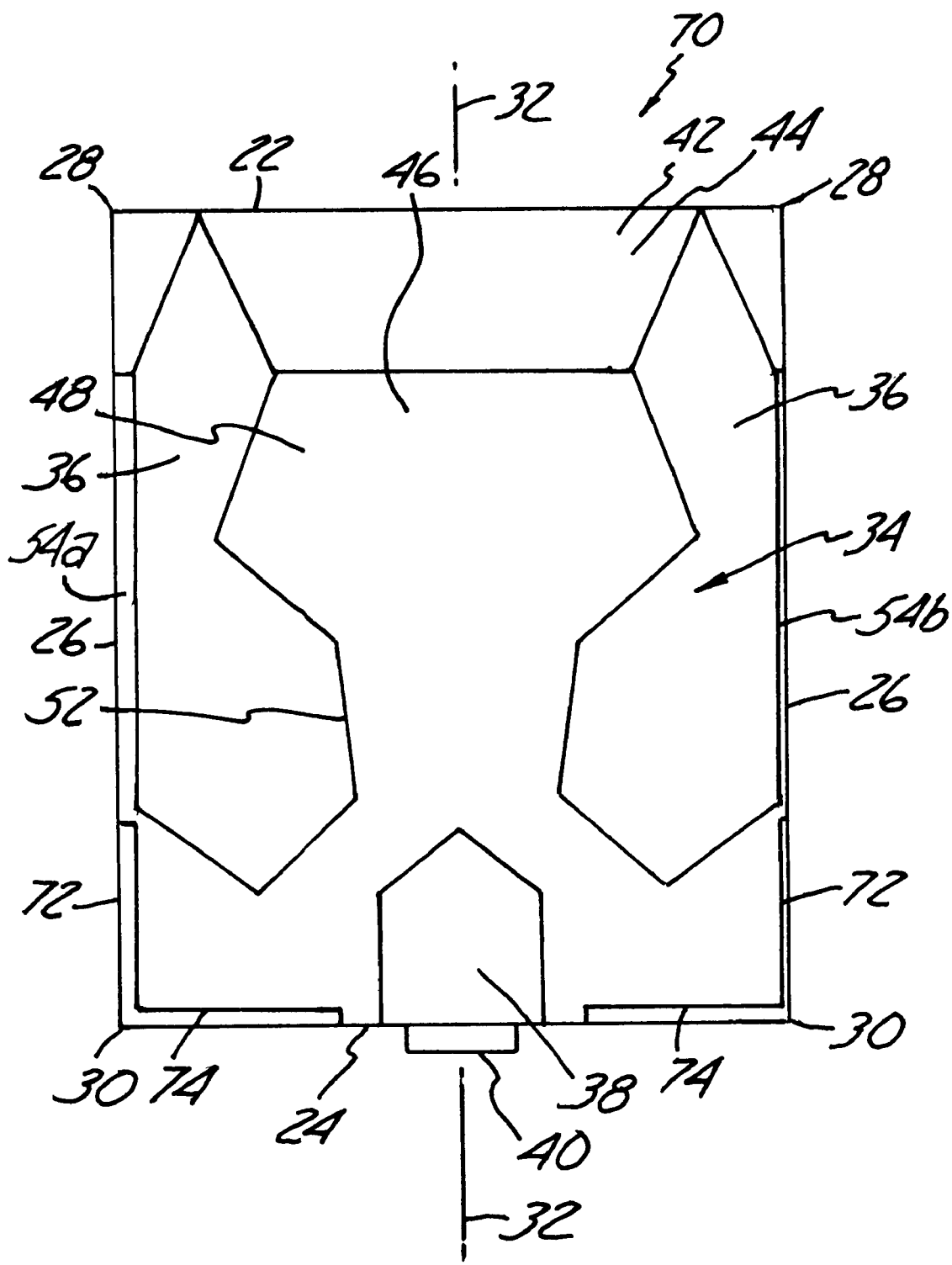
FIG. 8 is a plan view of an alternative embodiment of a slider of the present invention.

However, the corner step width cannot be selected tighter than the tolerance on the dicing location, which is further discussed with reference to FIG. 8. FIG. 8 shows a slider 70 with corner steps 72 of an alternative shape. The corner steps 72 have a corner step edge 74 which is generally parallel to the respective side edge 26 and the trailing edge 24, making each corner step 72 as narrow as possible. Because the corner steps 72 are very narrow, contact with the trailing corner 30 and the disc will be prevented at a high roll angle.

Additionally, FIG. 8 shows the effect of the tolerance on the dicing location. As shown in FIG. 8, the dice cuts may be offset relative to the longitudinal axis 32 of the air bearing surface 34 by an amount up to the tolerance value. The offset due to the tolerance of the dice cuts is most easily seen with reference to the edge steps 54, shown in FIG. 8 with edge step 54a significantly wider than edge step 54b. For instance, if the tolerance of the dice cuts is plus or minus 25 microns, edge step 54a may be up to 50 microns wider than edge step 54b.

With a tolerance on the dicing location at about plus or minus 25 microns, a nominal corner step width of 4 microns would translate to an actual corner step width anywhere from 0 (ie., not present) to 29 microns. The possibility of having a corner step 72 removed due to the tolerance on the dice cut operation should be avoided.

Accordingly, the size of the corner step 56 prior to dice cutting should extend inward on each air bearing slider 10 at least to most inward toleranced dice cut location. For instance, if the tolerance on the dice cut is plus or minus 25 microns, the corner step 56 should be at least nominally 25 microns. If the corner step 56 is nominally 25 microns, an actual corner step 56 will be from 0 to 50 microns wide. Assuming the corner step 56 is 4 microns deeper than the main cavity 46, a corner step 56 of just over 0 microns actual width will prevent contact between the trailing dice cut corner 30 and the disc up to a roll angle or arctan (4/0)=90°. A corner step 56 of 50 microns actual width will prevent contact between the trailing corner 30 and the disc up to a roll angle or arctan (4/50)=4.58°.

More preferably, the corner steps 72 are nominally sized to extend inward beyond a most inward tolerenced dice cut location by a small amount, such as the amount of the tolerance value or less. That is, with a tolerance on the dice cut of plus or minus 25 microns, the corner step 72 should be nominally one to two times the tolerance value, or nominally 25 to 50 microns wide. If the corner step 72 is nominally 50 microns wide, an actual corner step 56 will be from 25 to 75 microns wide. To ensure that dice cut corner contact is prevented up to a roll angle of 5°, the corner step 72 of 50 micron nominal width should be 75*tan(5°)=6.6 microns deeper than the main cavity 46, such as a corner step depth of 10 microns with a cavity depth of 3 microns. At roll angles between arctan(7/75)=5.30 and arctan(3/325)=0.53° and a high pitch angle, contact is with the corner step edge 72, which will generally not cause catastrophic damage. At roll angles less than arctan(3/325)=0.53°, contact is with the trailing pad 38 of the air bearing surface 34, which will generally not cause catastrophic damage, The term "contact", as used thus far, refers to the initial contact between the slider 10 and the disc assuming no deformation. However, neither the disc nor the slider 10 is entirely rigid. Instead, both can undergo some degree of temporary deformation prior to any permanent deformation. Damage to the disc drive most often occurs as permanent deformation of the disc caused by the impact between the slider 10 and the disc during a shock event. Due to temporary and/or permanent deformation of the disc and/or slider 10, actual contact occurs over a larger surface than the initial point contact considered thus far.

The corner step edge 74 of the embodiment of FIG. 8 is parallel to the longitudinal axis 32 of the slider 70 and relative to the side edge 26. The corner step edge 62 of the embodiment of FIGS. 1–7 is at an angle relative to the longitudinal axis 32 of the slider 10 and relative to the side edge 26. Depending upon the position of the corner step edge 62, 74 and the attitude of the slider 10 upon contact, angling of the corner step edge 62, 74 may further limit the amount of damage. In particular, contact damage and permanent deformation is more pronounced if the edges of a corner are all at a high angle to the plane of the disc upon contact. If contact is more spread toward a line or a surface of contact rather than at a direct point, more of the impact force will be withstood through temporary deformation over a larger area and less through permanent deformation at a point. Contact of the corner step edge 62 can only occur when both significant pitch and significant roll are present. Angling the corner step edge 62, 74 can help for contact to be spread more along the length of the corner step edge 62, 74 rather than at a specific point. Angling of the corner step edge can thus be used to further minimize damage upon contact.

If the pitch is not large, it will not be necessary to mill as deep to prevent contact between the corners 30 and the disc. Through careful design of suspension assemblies, some progress has been made in controlling the contact attitude of the slider 10 so the slider 10 recontacts the disc with a controlled, near-zero static attitude. Despite improved suspension design, it is not always possible to cause the slider 10 to contact on the air bearing surface 34. For a particular design, if the limits on both the pitch and roll at contact are known, then the design of the slider 10 may include a shallower corner step 56, 72 to ensure that contact on the dice cut corner 30 is prevented.

Figure 9:
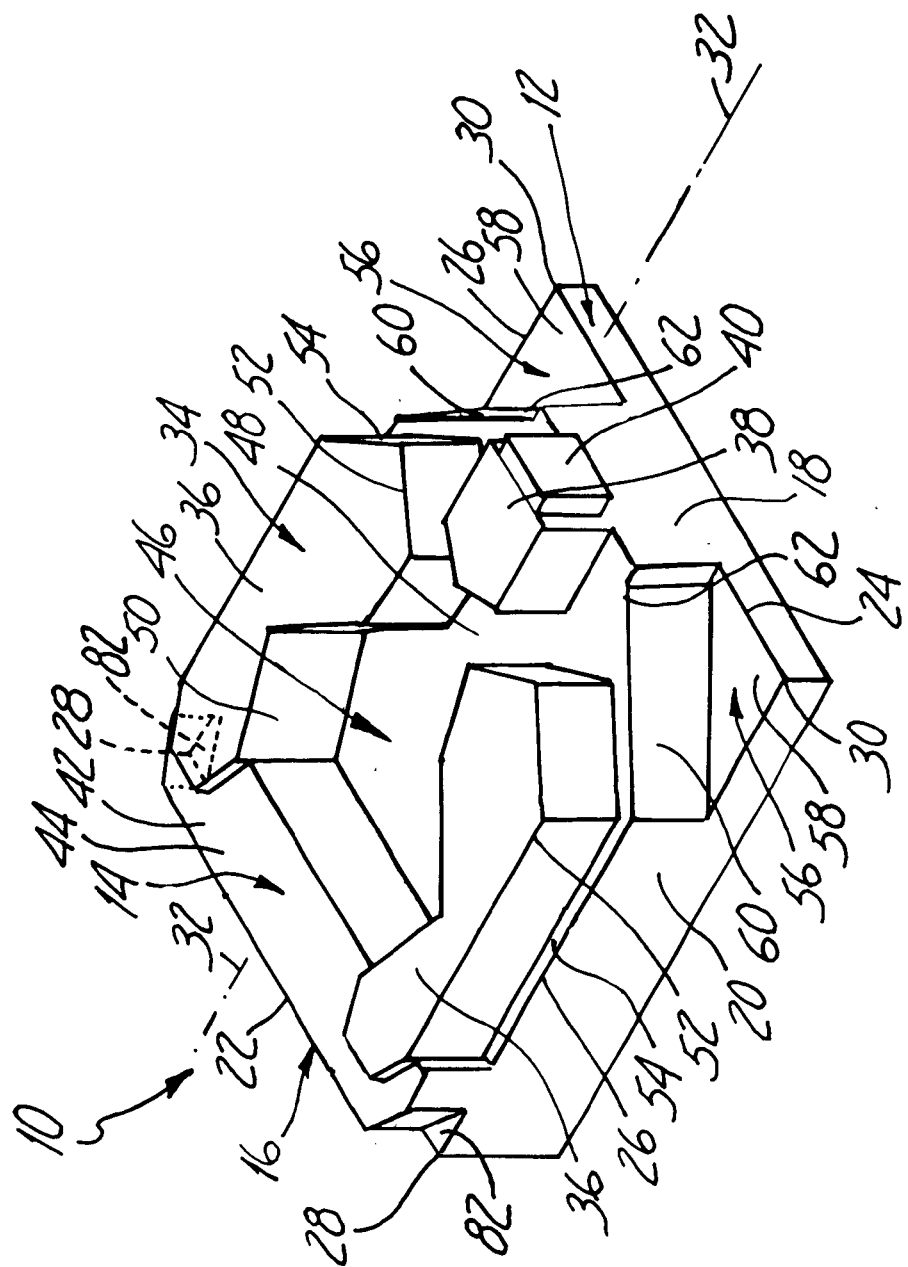
FIG. 9 is a perspective view of a second alternative embodiment of a slider of the present invention.

Thus far we have only discussed placing corner steps 56, 72 at trailing corners 30. Because the sliders 10, 70 flies at positive pitch angles, normally the leading corners 28 will not make first contact with the disc at a shock event. However, some shock events may cause the slider 10, 70 to impact the disc at a negative pitch angle, such as shock events that occur while the disc drive is not operating. FIG. 9 shows an alternative slider 80 of the present invention which helps to prevent damage in such situations. The slider has a corner step 82 at leading corners 28. The corner step 82 at leading corners 28 functions the same way as the corner steps 56, 72 at trailing corners 30, but is effective for contact at negative pitch angles as opposed to positive pitch angles.

Although the present invention has been described with reference to preferred embodiments, workers skilled in the art will recognize that changes may be made in form and detail without departing from the spirit and scope of the invention.

What is claimed is:

1. A method for manufacturing a plurality of air bearing sliders for a disc drive from a bar having a substantially flat face, comprising:
   recessing a cavity surface having a substantially uniform cavity depth into the bar, non-recessed portions defining air bearing surfaces of a plurality of air bearing sliders;
   recessing corner areas having a substantially uniform step depth into the bar, the substantially uniform step depth being greater than the substantially uniform cavity depth; and
   dicing the bar into a plurality of air bearing sliders, whereby at least portions of the recessed corner areas become corners of each of the air bearing sliders.

2. The method of claim 1, wherein the act of recessing a cavity surface comprises recessing with photolithography, wherein the act of recessing corner areas comprises recessing with photolithography, and wherein the substantially uniform cavity depth and the substantially uniform step depth are both measured relative to the air bearing surfaces of the plurality of air bearing sliders.

3. The method of claim 1, wherein the act of dicing comprising dicing dice cuts located on the bar with a tolerance value, wherein the act of recessing corner areas comprises recessing corner areas which are nominally sized to extend inward on each air bearing slider from one to two times the tolerance value.

4. The method of claim 3, wherein the act of recessing corner areas comprises recessing corner areas which are nominally sized to extend inward on each air bearing slider to the most inward toleranced dice cut location.

5. The method of claim 1, wherein the act of recessing corner areas comprises recessing corner areas both at leading corners and trailing corners of the air bearing slider.

6. The method of claim 1, further comprising:
   recessing a second cavity into the bar, the second cavity having a substantially flat second cavity surface substantially parallel to the air bearing surfaces at a second cavity depth from the air bearing surfaces different from the substantially uniform cavity depth, wherein the substantially uniform step depth of the corner areas is greater than the second cavity depth.

7. The method of claim 1, wherein the act of dicing defines a side edge of the slider body which does not intersect the air bearing surface.

8. The method of claim 1,
   wherein the substantially flat face of the bar extends between a first edge and a second edge, wherein the act of recessing a cavity surface recesses the cavity surface into the substantially flat face of the bar;
   wherein the act of recessing corner areas recesses corner areas which are substantially parallel to the air bearing surfaces, the corner areas intersecting at least one of the first edge and the second edge of the bar; and
   wherein the act of dicing the bar creates dice cuts intersecting at least portions of the recessed corner areas to form at least one leading or trailing corner of each of the air bearing sliders at the substantially uniform step depth.

9. The method of claim 8, wherein the act of recessing corner areas comprises recessing corner areas both at the leading corners and the trailing corners of the air bearing slider.

10. The method of claim 8, wherein the act of recessing corner areas defines an edge which is neither perpendicular nor parallel to the first edge and the second edge of the bar.

11. The method of claim 8, further comprising:
    recessing a first step into the substantially flat face of the bar as part of the air bearing surface at a first step depth less than the cavity depth such that the first step will interact with incident wind on the air bearing slider with a positive pressure, the first step separating the air bearing surface from the recessed corner area.

12. The method of claim 1, wherein the dicing act creates a plurality of air bearing sliders each comprising:
    a slider body having a disc opposing face comprising:
       a leading edge;
       a trailing edge opposite the leading edge and defining a length of the slider body;
       side edges substantially defined by the dicing running from the leading edge to the trailing edge, each side edge intersecting the leading edge at a leading corner, each side edge intersecting the trailing edge at a trailing corner, with the air bearing surface being disposed inward from at least one of the leading corners and trailing corners; and
       a corner step, the corner step having a substantially flat corner step surface substantially parallel to the air bearing surface at a corner step depth from the air bearing surface, the corner step including said at least one of the leading corners and trailing corners, wherein the corner step depth is greater than the cavity depth.

13. The method of claim 12, wherein the acts of recessing corner areas and dicing define a corner step which extends for only a portion of the length of the slider body.

14. The method of claim 12, wherein the acts of recessing corner areas and dicing define a corner step is sufficiently narrow to prevent contact between said at least one of the leading corners and trailing corner and a planar surface of a disc, at least at some combinations of pitch and roll of the air bearing slider relative to the planar surface of the disc.

15. The method of claim 14 wherein the acts of recessing corner areas and dicing define a corner step at the trailing corner, and wherein the corner step prevents contact between the trailing corner and the planar surface at a roll of 1° and at a high pitch angle.

16. The method of claim 15 wherein the acts of recessing corner areas and dicing define a corner step which prevents contact between the trailing corner and the planar surface at a roll of 3° and at a high pitch angle.

17. The method of claim 12 wherein the acts of recessing corner areas and dicing define a corner step which prevents contact between the trailing corner and the planar surface at a roll of 5° and at a high pitch angle.

18. The method of claim 12, further comprising:
    recessing a portion of the substantially flat face of the bar such that the air bearing surface has a trailing portion removed laterally inward from the side edge by a laterally removed distance measured parallel to the trailing edge, wherein
arctan(cavity depth/laterally removed distance)<1°.

19. A method for manufacturing a plurality of air bearing sliders for a disc drive from a bar having a substantially flat face extending between a first edge and a second edge, comprising:
   recessing a cavity surface having a substantially uniform cavity depth into the substantially flat face of the bar, non-recessed portions defining air bearing surfaces of a plurality of air bearing sliders;
   recessing corner areas having a substantially uniform step depth into the bar, the corner areas being substantially parallel to the air bearing surfaces, the corner areas intersecting at least one of the first edge and the second edge of the bar, the substantially uniform step depth being greater than the substantially uniform cavity depth; and
   dicing the bar into a plurality of air bearing sliders, wherein the dice cut intersects at least portions of the recessed corner areas to form at least one leading or trailing corner of each of the air bearing sliders at the substantially uniform step depth.

20. A method for manufacturing a plurality of air bearing sliders for a disc drive from a bar having a substantially flat face, comprising:
   recessing a cavity surface having a substantially uniform cavity depth into the bar, non-recessed portions defining air bearing surfaces of a plurality of air bearing sliders;
   recessing corner areas having a substantially uniform step depth into the bar, the substantially uniform step depth being greater than the substantially uniform cavity depth; and
   dicing the bar into a plurality of air bearing sliders, each air bearing slider comprising:
      a slider body having a disc opposing face comprising:
         a leading edge;
         a trailing edge opposite the leading edge and defining a length of the slider body;
         side edges substantially defined by the dicing running from the leading edge to the trailing edge, each side edge intersecting the leading edge at a leading corner, each side edge intersecting the trailing edge at a trailing corner, with the air bearing surface being disposed inward from at least one of the leading corners and trailing corners; and
      a corner step, the corner step having a substantially flat corner step surface substantially parallel to the air bearing surface at a corner step depth from the air bearing surface, the corner step including said at least one of the leading corners and trailing corners, wherein the corner step depth is greater than the cavity depth.

* * * * *

UNITED STATES PATENT AND TRADEMARK OFFICE
CERTIFICATE OF CORRECTION

PATENT NO. : 6,311,388 B1
DATED : November 6, 2001
INVENTOR(S) : Lowell J. Berg et al.

It is certified that error appears in the above-identified patent and that said Letters Patent is hereby corrected as shown below:

<u>Title page,</u>
Item [75], Inventors, delete "boutaglou", insert -- Boutaghou --

<u>Column 2,</u>
Line 43, delete "win", insert -- will --

Signed and Sealed this

Fourth Day of June, 2002

Attest:

JAMES E. ROGAN
Attesting Officer        Director of the United States Patent and Trademark Office

UNITED STATES PATENT AND TRADEMARK OFFICE
CERTIFICATE OF CORRECTION

PATENT NO.    : 6,311,388 B1
DATED         : November 6, 2001
INVENTOR(S)   : Berg et al.

Page 1 of 1

It is certified that error appears in the above-identified patent and that said Letters Patent is hereby corrected as shown below:

<u>Title page,</u>
Item [73], the assignee information should be changed from "Seagate Technology, Inc., Scotts Valley, CA (US)" to -- Seagate Technology LLC, Scotts Valley, CA (US) --

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,311,388 B1
DATED : November 6, 2001
INVENTOR(S) : Lowell J. Berg et al.

It is certified that error appears in the above-identified patent and that said Letters Patent is hereby corrected as shown below:

<u>Title page,</u>
Item [73], Assignee, delete "Seagate Technology, Inc." insert,
-- Seagate Technology LLC --

Signed and Sealed this

Tenth Day of February, 2004

JON W. DUDAS
*Acting Director of the United States Patent and Trademark Office*